US008462694B2

(12) United States Patent
Paetsch

(10) Patent No.: US 8,462,694 B2
(45) Date of Patent: Jun. 11, 2013

(54) PROCESS AND APPARATUS FOR MAKING A TELECOMMUNICATIONS CONNECTION TO A CALLED PORTABLE RADIO TERMINAL

(75) Inventor: Frank Paetsch, Berlin (DE)

(73) Assignee: TELES AG Informationstechnologien, Berlin (DE)

( * ) Notice: Subject to any disclaimer, the term of this patent is extended or adjusted under 35 U.S.C. 154(b) by 848 days.

(21) Appl. No.: 12/404,060

(22) Filed: Mar. 13, 2009

(65) Prior Publication Data

US 2009/0233610 A1 Sep. 17, 2009

(30) Foreign Application Priority Data

Mar. 16, 2008 (DE) .......................... 10 2008 014 229

(51) Int. Cl.
*H04W 4/00* (2009.01)
(52) U.S. Cl.
USPC ........................................................ 370/328
(58) Field of Classification Search
USPC ........................................ 370/401, 310, 338
See application file for complete search history.

(56) References Cited

U.S. PATENT DOCUMENTS

| 6,985,756 | B2* | 1/2006 | Castrogiovanni et al. | 455/558 |
| 7,218,928 | B2* | 5/2007 | Park et al. | 455/423 |
| 2006/0291483 | A1* | 12/2006 | Sela | 370/401 |
| 2007/0184858 | A1* | 8/2007 | Landschaft et al. | 455/466 |

FOREIGN PATENT DOCUMENTS

| DE | 102 49 086 B4 | 5/2004 |
| DE | 103 11 980 A1 | 9/2004 |
| DE | 103 14 144 A1 | 10/2004 |
| EP | 1 357 732 B1 | 10/2003 |
| WO | 2004-086788 A | 10/2004 |

OTHER PUBLICATIONS

Discovery Telecom Technologies: "The DTT Virtual SIM System for Carrier Class GSM Gateways," Dec. 19, 2006, pp. 1-30, XP 002529086.
ECOTEL Multichannel; ECOTEL SIM Card Server (SCS), ECOTEL SIM Management Center (SMC); Vierling Communications GmbH; www.vierling.de; Technical changes reserved: Sep. 2007.

* cited by examiner

*Primary Examiner* — Mark Rinehart
*Assistant Examiner* — Mohammad Anwar
(74) *Attorney, Agent, or Firm* — Novak Druce Connolly Bove + Quigg LLP; Vincent M DeLuca

(57) ABSTRACT

The invention relates to a method and a telecommunication arrangement for providing a telecommunication connection (TC connection) to a called mobile radio terminal. Routing information are provided to a switch (3) via which a connection establishment to a called mobile radio terminal (2, 2', 2") takes place, that regard the forwarding of the connection establishment to a certain mobile radio gateway (51, 52, 53). For providing the routing information data of a insertion card device (4) regarding at least one parameter of those insertion cards is evaluated, that are allocated to a mobile radio gateway upon undergoing the connection establishment and are arranged and administered together in the insertion card device (4). By means of this evaluation one of the administered insertion cards is selected for the mobile communication to the called mobile radio terminal (2, 2', 2"). The connection establishment is forwarded from the switch (3) to the mobile radio gateway (51, 52, 53) allocated to the selected insertion cards by means of the provided routing information.

23 Claims, 1 Drawing Sheet

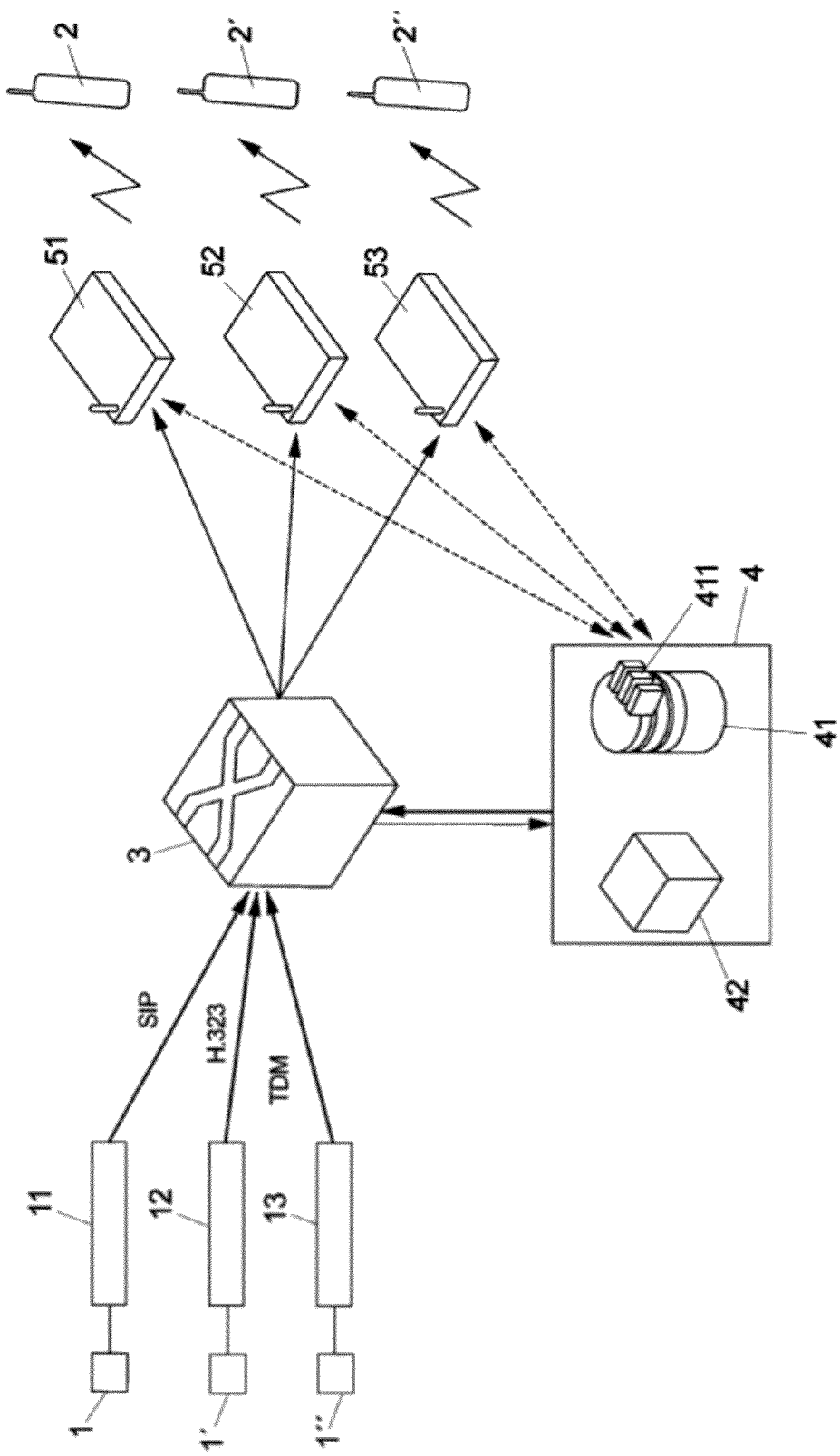

PROCESS AND APPARATUS FOR MAKING A TELECOMMUNICATIONS CONNECTION TO A CALLED PORTABLE RADIO TERMINAL

The invention relates to a method for providing a telecommunication connection (TC connection) to a called mobile radio terminal and a telecommunication arrangement for conducting the method.

BACKGROUND OF THE INVENTION

So called mobile radio gateways are known that provide an interface between one or several telecommunication mobile radio networks and arbitrary other networks, for instance a telecommunication fixed network or an IP-network. A mobile radio gateway is called by a user of another network and forwards the requested connection via a mobile radio channel to the mobile radio network in which the called party resides. For this, the mobile radio gateway implements the functionality of a mobile radio telephone and, in a way, calls the called party as a mobile radio telephone. Mobile radio gateways therefore possess the same mobile radio modules that are employed in mobile radio terminals (cell phones). Such mobile radio gateways are known for instance from DE 103 14 144 A1.

It is thereby provided that the mobile radio gateway contains a plurality of insertion cards, particularly so called SIM cards for the administered mobile radio channels. Arbitrary SIM cards of different network providers can be employed. A SIM card is an insertion card having an identifier by means of which a mobile radio device is allocated to a certain network provider, gets a certain call number and is clearly identifiable in all mobile radio networks. Moreover, a SIM card comprises a PIN number (PIN—Personal Identity Number), security-relevant data such as communication keys and safety algorithms, user-specific data such as abbreviated dialling numbers as well as net-specific data such as the identifier of the current sojourn area. A SIM card personalizes a mobile radio terminal concerning the user and concerning the network provider and allows for the account of call charges by the network provider.

From EP 13 57 732 B1 a server for a telecommunication system and a method for generating a telecommunication connection is known in case of which SIM cards are administered in a central SIM server and a SIM card is allocated to a local unit upon existence of a dial signal for the purposes of the telecommunication connection to be established.

The problem underlying the present invention is to provide a method for efficiently providing a telecommunication connection to a mobile radio terminal using a mobile radio gateway and a telecommunication arrangement for conducting the method.

ABSTRACT OF THE INVENTION

According to the invention this problem is solved by a method having the features of claim 1 and a telecommunication arrangement having the features of claim 14. Exemplary embodiments of the invention are stated in the subclaims.

According thereto a switch via which a connection establishment to a called mobile radio terminal occurs is provided with routing information that regards the forwarding of the connection establishment to a certain mobile radio gateway. For providing the routing information, data of an insertion card device regarding at least one parameter of insertion cards is evaluated, which insertion cards are allocated to a mobile radio gateway, respectively, and which are arranged and administered together in the insertion card device. Thereby, data regarding at least one parameter of those of the administered insertion cards is evaluated that upon incoming of the connection establishment are allocated to a mobile radio gateway. By means of this evaluation, one of the administered insertion cards allocated to a mobile radio gateway is selected for the mobile communication to the called mobile radio terminal. The connection establishment is forwarded by means of the provided routing information to the mobile radio gateway that is allocated to the selected insertion card. A mobile radio channel is provided using the selected insertion card, and the provided mobile radio channel is used for the TC connection to the mobile radio terminal.

The evaluation of data according to the invention regarding parameters of the administered insertion cards for providing routing information for the switch only occurs regarding those of the administered insertion cards that are currently, i.e., upon incoming of a connection establishment request, allocated to a mobile radio gateway. Only to these insertion cards and mobile radio channels allocated thereto a routing of an incoming connecting establishment shall take place. Otherwise, an insertion card would still have to be allocated to a mobile radio gateway in case of the presence of an connection establishment request which is to be avoided, since this would cause a considerable delay of the dial up (so called "post dial delay").

In one embodiment, the insertion card device can be a so called SIM server. In a SIM server insertion cards for mobile radio communication are provided at a central location or rather in a central computer. Depending on requirement and demand, an insertion card is on the part of a mobile radio gateway requested for by the central computer and is provided by the latter to the mobile radio gateway. This provision of the insertion card for the mobile radio communication does not take place physically. Merely those information that identify the insertion card and reflect its functionality are transmitted to the mobile radio gateway via remote data transmission. Such SIM servers are described for instance in DE 103 11 980 A1.

The insertion card for the mobile radio communication thus resides in a way virtually on a central computer and its functionality is emulated on the mobile radio gateway on the basis of specific information and data that are transmitted by the central computer, if necessary. This allows for the use of central insertion card pools for one or several mobile radio gateways.

The solution according to the invention allows to control a switch (for instance a switch site) by means of an insertion card device because of data available to the insertion card device, for instance the availability, the priority and the quality of the administered insertion cards and to conduct a telecommunication connection, particularly a call and signalling allocated thereto onto a mobile radio gateway by means of the selected SIM card.

Thus, the method according to the invention allows for an efficient selection of the proper "route" within the switch to the insertion cards and mobile radio gateways administered by an insertion card device using information of the insertion card device. Thereby, present data of the insertion card device, for instance concerning priority, tariff model and quality of the cards are used for further control of the calls. For instance, available channels having a higher priority and/or a better tariff model and/or a better quality are preferably used for a call. Herewith, the invention allows for an efficient utilization of the resources and signalling. A multiple dial-in of the individual mobile radio gateways can be avoided, for instance. Furthermore, a delay of the dial-up after dialling ("post dial delay") is strongly reduced by means of the invention, since an alternative routing can be omitted in case of unavailability.

It is noted, that in the sense of the invention the notion "insertion card" is to be understood functionally. Usually, this is a matter of pluggable or pushable chip cards. Basically, the functionality of an insertion card can however also be provided by a software that is downloaded onto the telecommunication device for example via the internet, via radio or a CD. The SIM card design is an example. Future standards of mobile radio communication may provide other insertion cards.

In an embodiment of the invention, the switch informs the insertion card device or a device allocated thereto about the connection establishment request to the called mobile radio terminal for providing routing information, the insertion card device or a device allocated thereto hereupon generates a routing information by evaluating at least one parameter of the insertion cards administered by the insertion card device, the insertion card device informs the switch about this routing information, which switch hereupon routes the call correspondingly. Thereby, in an embodiment, the routing information contains at least data that identifies the selected insertion card and a mobile radio gateway allocated thereto. This allocation can be fixed or it is conducted by the insertion card device for the current TC process.

The parameter or the parameters of the insertion cards that are evaluated for providing the routing information may be manifold. A possible parameter is the availability of the cards. According thereto, only a card is selected that is currently not occupied, i.e., that is not already used for a mobile radio communication. A further possible parameter is a time and/or money quota of the insertion cards, for instance as available for prepaid cards. In case such a quota is for instance nearly expired such a card is not selected in case of a requested premium connection. A further possible parameter is a priority allocated to the insertion cards. There may exist insertion cards having high priority that are preferentially employed or that are preferentially employed in case of certain categories of connections, for instance premium connections. A further possible parameter is a tariff allocated to the insertion cards, wherein the tariff may be accompanied by a certain priority. A further possible parameter is the belonging of the insertion cards to a certain mobile radio network, respectively. Thus, as a general rule, an insertion card will be selected that belongs to the same mobile radio network as the called mobile radio terminal or its insertion card, so that a further routing of the mobile radio call between gateway and mobile radio terminal is not necessary, even if such a further routing is by no means excluded.

A further possible parameter is given by at least one quality feature allocated to the insertion cards. This can be a mean connection time ("average call duration") of the mobile radio connections realized with the respective insertion cards. Further, this may concern a signal strength of the mobile radio connection realized with the respective insertion cards. Further, this may concern the ratio between the successful and the connection attempts of the respective insertion cards that occurred altogether, the so called "average seizure ratio"—ASR. The ASR, as well as the criteria mentioned before, represent a measure for the network quality that is defined in the ITU recommendation SG2 E.411.

The telecommunication arrangement according to the invention comprises:
a switch of a communication network,
at least one mobile radio gateway having a plurality of radio modules for the mobile radio communication, respectively, wherein to each mobile radio gateway a plurality of insertion cards furnished with an identifier is allocated that allow for a use of a radio module for the mobile radio communication, respectively, and
an insertion card device in which the insertion cards allocated to the mobile radio gateway or the mobile radio gateways are arranged and administered together, wherein
the insertion card device or a device allocated thereto is adapted and designed to provide the switch with routing information that regards the forwarding of a connection establishment to a mobile radio gateway and for this purpose evaluates data concerning at least one parameter of those of the administered insertion cards that upon incoming of the connection establishment are allocated to a mobile radio gateway, and, by means of this evaluation, selects an insertion card allocated to a mobile radio gateway for the mobile communication to the called mobile radio terminal.

The individual components of the telecommunication arrangement according to the invention may thereby be realized inside a single network or may completely or partly reside in different networks.

The device allocated eventually may be a system for instance that may access data of the insertion card device and evaluate this data.

In an embodiment, the switch comprises an interface for call control, and the insertion card device or the device allocated thereto comprises a call management module. Thereby, the interface and the call management module are designed such that the switch, in case a connection establishment request to the called mobile radio terminal exists, signalizes the connection establishment request to the call management module via the interface, the call management module selects one of the insertion cards on the basis of the evaluation of the data concerning at least one parameter of the administered insertion cards, and hereupon the called management module transmits, as routing information, information concerning the selected insertion card and a mobile radio gateway allocated thereto to the switch via the switch's interface.

In an embodiment, the interface is designed according to an open interface standard for call control of the switch. By means of the possible use of open interface standards for an external routing platform for controlling the switches (for instance RADIUS) the method and the TC arrangement may be independent from the used switch. Alternatively, the interface may also be proprietary.

In principle, the switch may be designed arbitrarily and may be designed in an arbitrary network. In an embodiment the switch may be a TDM switch of a circuit switching network, for instance a telecommunication fixed line network. In another embodiment the switch may be a soft switch for example of a next generation network.

DESCRIPTION OF EMBODIMENTS

In the following, the invention is explained in more detail by means of embodiments with reference to the single FIGURE of the drawing.

FIG. 1 shows a telecommunication arrangement having a switch and mobile radio gateways and an insertion card device connected thereto.

FIG. 1 shows a telecommunication arrangement that allows for the establishment and the provision of a TC connection between a called communication device 1, 1', 1" and a called communication device 2, 2', 2". The called communication device 1, 1', 1" may be a telecommunication terminal (TC terminal), for instance. Particularly, the called communication device 1, 1', 1" can be a fixed line network telephone, an IP telephone, a mobile radio telephone, a computer having a telephone software, a handheld, a WLAN compatible terminal etc.

The called communication device 2, 2', 2" is a mobile radio terminal. Therewith, each device is denoted that comprises a radio module and an insertion card that allows for a mobile radio communication. Particularly, every device is a mobile radio device that comprises a mobile station (MS) having a mobile or stationary mobile telephone and a SIM card.

The called communication device 1, 1', 1" is connected to a switch 3 via a communication network 11, 12, 13 which switch 3 also belongs to a communication network that can be the same network as one of the networks 11, 12, 13 or a different network. The communication network 11, 12, 13 via which a terminal 1, 1', 1" is connected to the switch 3 may be for instance an IP network, for example the internet, a circuit switching network, for instance a telecommunication fixed line network, a mobile radio network or a WLAN. The switch 3 is a TDM switch or a soft switch, for instance. At the same time, the connection of the terminal 1, 1', 1" to the switch 3 is only exemplary depicted in the FIGURE as occurring via a network 11, 12, 13. The connection to the switch 3 may also take place via several networks of the same or different kind.

Furthermore, several mobile radio gateways 51, 52, 53 are directly or indirectly connected to the TC network, in which the switch 3 is arranged. In case of an indirect connection, the connection takes place via several networks that are connected to each other.

Each mobile radio gateway 51, 52, 53 provides a network access to at least one mobile radio network. In Germany this may concern the networks T-Mobile, Vodafone, E-Plus and $O_2$. Via a mobile radio gateway 51, 52, 53 one mobile radio channel and therewith one call to a called mobile radio terminal 2, 2', 2" may be established, respectively. Into each mobile radio gateway 51, 52, 53 a plurality of mobile stations may thereby be integrated, each comprising a radio model and a SIM card.

However, the SIM cards are not physically present in the mobile radio gateways 51, 52, 53, but are merely emulated there or the like. Instead, the SIM cards of the mobile radio gateways 51, 52, 53 are arranged in a central SIM server 4. Depending on specification and demand, a SIM card on the part of a mobile radio gateway 51, 52, 53 is requested by the SIM server 4 and provided to the mobile radio gateway 51, 52, 53 by this SIM server 4. Such a provision of a SIM card does not take place physically. Merely information that identifies a SIM card and reflects its functionality is transmitted to the mobile radio gateway 51, 52, 53 via remote data transmission.

The SIM server 4 comprises a card administration device 41 and a call management module 42. The card administration device 41 possesses a plurality of SIM card read devices 411, into which a SIM card is insertable, respectively. In an embodiment, a plurality of card read devices 411 having a plurality of SIM cards is present that can be allocated to different networks and may comprise different tariff models, qualities and priorities. Via a central control (not shown) the individual SIM cards are monitored and eventually allocated to a mobile radio gateway 51, 52, 53, wherein such an allocation may be fixed or temporary. Such card administration devices are known from DE 103 11 980 A1.

In case of a temporary allocation, an allocation of a SIM card to a mobile radio gateway 51, 52, 53 takes place for a certain period, for example, in order to use a low priced tariff during this period or for using a certain money quota of the SIM card. In no event, an allocation of a SIM card to a mobile radio gateway 51, 52, 53 takes place until a certain incoming call exists. Since in such a case, due to the then existing necessity of the SIM card to register itself for the incoming call in the mobile radio network, the call may not be established in a reasonable time: the post dial delay would be too large. In other words, a temporary allocation of an insertion card to a mobile radio gateway 51, 52, 53 is always independent of connection establishment information.

Thus, the temporary allocation of a SIM card to a mobile radio gateway 51, 52, 53 always takes place depending on attributes or parameters such as for instance certain tariffs or money quotas that are independent of connection establishment information and have nothing to do with these things. Therewith, the temporary allocation of a SIM card always comprises a time component. For a considered incoming call always one SIM card is selected that is already fixedly or temporarily allocated to a mobile radio gateway 51, 52, 53 and is already registered in a mobile radio network.

In the depicted embodiment, the call management module 42 is integrated into the SIM server 4. It can however also be designed as a separate unit or a part of another system in which case this unit or this system communicates with the SIM server which then consists of the card administration device 41. The call management module 42 has access to data concerning the SIM cards administered by the administration device 41. Particularly, it can detect and evaluate their parameters, for instance concerning a current availability of the cards and/or the belonging to a certain mobile radio network and/or a time or money quota of the cards and/or the priority of the cards and/or the quality of the cards and/or a tariff model of the cards.

The SIM server 4 may communicate with the switch 3 via the call management module 42 and may provide the latter with routing information. The switch 3 is in so far controllable by the call management module 42. Hereto, the switch 3 comprises an interface and is not depicted separately which allows for a communication to the call management module. The interface can be designed according to an open interface standard, for example RADIUS ("Remote Authentication Dial-IN User Service") or as a proprietary interface.

Thus, the TC network contains a "controllable" switch 3 based on open or proprietary interfaces for call control. The SIM server 4 itself or a system that accesses the data of the SIM server 4, contains the call management module 42 that can control by means of the control interface of the switch 3 calls of the switch 3. The switch 3 signalizes an incoming call to the call management module 42 and the call management module 42 selects, because of information concerning at least one parameter of the SIM cards administered by the SIM server 4, a SIM card already allocated to a mobile radio gateway 51, 52, 53 and therewith an available channel in a mobile radio gateway 51, 52, 53.

Parameters which are evaluated by the call management module 42 for selection of a SIM card are for instance the availability of the SIM card in an available channel of the mobile radio gateway, the priority of the available SIM cards, wherein the priority is based on a tariff model or other characteristics, as well as the quality of the available SIM cards. For determining the "quality" of a SIM card the mean call time ("average call duration"), the signal strength and/or the ratio between the successful and the connection attempts of the respective SIM card ("average seizure ratio") that occurred altogether is determined, for instance.

In an embodiment, the incoming call is sent to the "best possible" SIM card in a mobile radio channel of a mobile radio gateway 51, 52, 53. This "routing information" the SIM card and a mobile radio gateway allocated to the SIM card upon incoming of the call contains, is given back to the switch 3 and the TC network sends the call to the corresponding available mobile radio gateway and mobile radio channel.

In detail, the course of the method is as follows.

If a terminal 1, 1', 1" wants to establish a telecommunication communication, particularly a telephone connection to a mobile radio terminal 2, 2', 2", the connection request is routed to the switch 3 via one of the telecommunication networks 11, 12, 13 and eventually via further networks. The signaling can take place for instance according to the protocols SEP (Session Initiated Protocol), H.323, or, particularly, concerning circuit switching connections, for instance in the framework of ISDN (Integrated Services Digital Network) or SS7 (Signalizing System Number 7) signaling.

The call to the called mobile radio terminal, for instance a mobile radio terminal 2, is received in switch 3. For switch 3 the question now arises, to which of the mobile radio gateways 51, 52, 53 and to which of the mobile stations of the respective mobile radio gateways 51, 52, 53 and thereby to which of the SIM cards allocated to the mobile radio gateways 51, 52, 53 the call shall be routed. For this, the switch 3 announces the incoming call to the call management module 42. The call management module 42 now selects, as explained, for instance because of the SIM allocation that has taken place, because of the availability (is the SIM card locked into the mobile radio network and is the channel available?), because of an adjusted or determined priority of an available SIM card, and eventually because of the quality of an available SIM card, one of the SIM cards that are allocated to the mobile radio gateways 51, 52, 53. Thereby, in an embodiment, the "best possible" SIM card is selected, i.e., the SIM card that corresponds to predefined evaluation criteria concerning the respective parameters in the best way.

By means of the allocation of a SIM card that has taken place, the mobile radio gateway to be used as well as the mobile radio channel to be used are defined. This information concerning the mobile radio gateway and the mobile radio channel, wherein the mobile radio channel is defined by the SIM card, is transmitted to the switch 3 by the call management module 42 via the interface of the switch 3 as a response. Hereupon, the switch 3 routes the call to the requested mobile radio gateway 51 and from there to the mobile station having the selected SIM card. The selected mobile station now realizes a mobile radio channel to the called mobile radio terminal 2. The selected mobile station thereby calls the mobile radio terminal 2 using the selected SIM card. The call is thereby transmitted to the mobile radio terminal 2, for instance via a transceiver station BTS (BTS—Base Transceiver-Station), an allocated control device, and further network infrastructure of the involved mobile radio network.

Thus, a mobile radio channel is provided using the selected SIM card and—after completion of the dial up to the called mobile radio terminal 2 and after interconnecting the call—used for the TC connection to the mobile radio terminal 2.

According to the described method, a switch is controlled by means of a SIM server on the basis of data concerning the administered insertion cards available to the SIM server and an incoming connection request is concertedly routed to a mobile radio gateway and a SIM card allocated thereto and selected upon incoming of the call. The routing information provided with the switch thus concern the selection of a SIM card and therewith of a mobile radio channel out of the set of the administered SIM cards, which are upon incoming of a connection establishment request allocated to at least one of the mobile radio gateways.

The invention is not limited to one of the afore-mentioned embodiments. For instance, in further embodiments other networks or protocols may be used. It can also be provided for instance that the SIM server consists of several distributed units and/or communicates with the switch in another way. It can also be provided that the generation of the routing information does not take place in the SIM server or in a call management module allocated thereto, but in a switch itself.

The invention claimed is:

1. Method for providing a telecommunication connection ("TC connection") to a called mobile radio terminal, comprising:
    routing of a connection establishment request to a switch of a communication network, wherein
        a plurality of mobile radio gateways each having a plurality of radio modules for mobile radio communication with a mobile radio terminal are connected to the communication network either directly or via at least one further communication network,
        a plurality of insertion cards each furnished with an identifier are allocatable to one of said plurality of mobile radio gateways, which insertion cards each allow for use of a respective radio module for mobile radio communication, and
        the insertion cards allocatable to one of said plurality of mobile radio gateways are arranged and administered together in an insertion card device, wherein said insertion card device is remotely located with respect to said plurality of mobile radio gateways,
    providing of routing information for the switch regarding the forwarding of the connection establishment to a mobile radio gateway, wherein for providing the routing information, data of the insertion card device is evaluated relating to at least one parameter of those of the administered insertion cards that are allocated to a mobile radio gateway upon receiving an incoming connection establishment request, and as a result of the evaluation an insertion card allocated to one of said plurality of mobile radio gateways is selected for mobile communication with the called mobile radio terminal and routing information based on data of the selected insertion card is provided to the switch,
    forwarding of the connection establishment by means of the provided routing information from the switch to the mobile radio gateway that is allocated to the selected insertion card,
    providing a mobile radio channel using the selected insertion card, and
    using the provided mobile radio channel for the TC connection to the mobile radio terminal.

2. Method according to claim 1, wherein for providing routing information, the switch informs the insertion card device or a device allocated thereto about the request for connection establishment to the called mobile radio terminal, the insertion card device or the device allocated thereto generates routing information by evaluating at least one parameter of the insertion cards administered by the insertion card device and informs the switch about this routing information.

3. Method according to claim 1 wherein the routing information at least contains data that identifies the selected insertion card and mobile radio gateway allocated thereto.

4. Method according to claim 1, wherein for providing the routing information the availability of the insertion card is evaluated as a parameter of the administered insertion cards.

5. Method according to claim 1 wherein for providing the routing information a time and/or money quota is evaluated as a parameter of the administered insertion cards.

6. Method according to claim 1 wherein for providing the routing information a priority allocated to the insertion cards is evaluated as a parameter of the administered insertion cards.

7. Method according to claim 1, wherein for providing the routing information a tariff allocated to the insertion cards is evaluated as a parameter of the administered insertion cards.

8. Method according to claim 1, wherein for providing the routing information the belonging of the insertion card to a certain mobile radio network, respectively, is evaluated as a parameter of the administered insertion cards.

9. Method according to claim 1, wherein for providing the routing information at least one quality feature allocated to the insertion cards is evaluated as a parameter of the administered insertion cards.

10. Method according to claim 9, wherein as a quality feature at least one of the following is evaluated:
the mean connection time of the mobile radio connection realized with the respective insertion cards,
the signal strength of the mobile radio connections realized with the respective insertion cards, and
the ratio between the successful and the unsuccessful connection attempts of the respective insertion cards.

11. Method according to claim 1, wherein such an insertion card for the mobile communication to the called mobile radio terminal is selected, concerning which the evaluation of the at least one parameter yields that the parameter or the parameters fulfil, on the basis of an evaluation determined in beforehand, the evaluation criteria best or as well as other insertion cards.

12. Method according to claim 1, wherein the allocation of an insertion card to a mobile radio gateway takes place fixedly or temporarily.

13. Method according to claim 12, wherein a temporary allocation of an insertion card to a mobile radio gateway takes place independently of connection establishment information.

14. Method according to claim 1, wherein said connection establishment request is routed to said switch through a communication network that is either a fixed network or a computer network.

15. Telecommunication arrangement for providing a telecommunication connection ("TC connection") to a called mobile radio terminal, comprising:
a switch of a communication network,
a plurality of mobile radio gateways each having a plurality of radio modules for mobile radio communication with mobile radio terminals, wherein a plurality of insertion cards each furnished with an identifier is allocatable to one of said plurality of mobile radio gateways, each of which allow for a use of a radio module for mobile radio communication,
an insertion card device in which the insertion cards are arranged and administered together, wherein said insertion card device is remotely located with respect to said plurality of mobile radio gateways, wherein
the insertion card device or a device allocated thereto is adapted and designed to provide the switch with routing information that relates to forwarding of a connection establishment request to a mobile radio gateway, and upon receiving an incoming connection establishment request, to evaluate data concerning at least one parameter of those of the administered insertion cards that are allocated to a mobile radio gateway, and, as a result of this evaluation, selects an insertion card allocated to a mobile radio gateway for the mobile communication to the called mobile radio terminal.

16. Device according to claim 15, wherein the switch comprises an interface for call control and the insertion card device or the device allocated thereto comprises a call management module, wherein the interface and the call management module are designed such, that
the switch upon existence of a connection establishment request to the called mobile radio terminal signals the connection establishment request to the call management module via the interface,
the call management module on the basis of the evaluation of the data regarding at least one parameter of the administered insertion cards selects one of the insertion cards, and thereupon
the call management module transmits as routing information to the switch information regarding the selected insertion card and a mobile radio gateway allocated thereto via the switch's interface.

17. Device according to claim 16, wherein the interface for call control of the switch is designed according to an open interface standard.

18. Device according to claim 15, wherein the call management module is designed such that it evaluates at least one of the following parameters for the selection of one of the administered insertion cards:
the availability of the insertion cards,
a time and/or money quota of the insertion cards,
a priority allocated to the insertion cards,
a tariff allocated to the insertion cards,
the belonging of the insertion cards to a certain mobile radio network, respectively, and
at least one quality feature allocated to the insertion cards.

19. Device according to claim 15, wherein the switch is a TDM switch or a soft switch.

20. Device according to claim 15 wherein the insertion cards are SIM cards.

21. Device according to claim 15, wherein the insertion card device is a SIM server.

22. Apparatus for establishing a telecommunications connection between a calling communication terminal and a called mobile radio terminal, comprising:
a plurality of mobile radio gateways, each including a plurality of radio modules for mobile radio communication with mobile radio terminals;
a SIM server including a plurality of SIM cards each selectively allocatable to any one particular radio module of a mobile radio gateway of said plurality of mobile radio gateways and containing data specifying at least one parameter that enables the radio module to which it is allocated to carry out mobile radio communication with mobile radio terminals, wherein data of a SIM card allocated to a particular radio module of a mobile radio gateway is transmitted from said SIM server to said particular radio module via remote data transmission; and
a switch that receives a request from a calling communication terminal to establish a telecommunications connection to a called mobile radio terminal, communicates said request to said SIM server, receives routing information from said SIM server that specifies a radio module of a mobile radio gateway, and establishes a telecommunications connection with the radio module specified by said routing information from said SIM server.

23. A method for establishing a telecommunications connection between a calling communication terminal and a called mobile radio terminal, comprising:

receiving at a switch a request from a calling communication terminal to establish a telecommunications connection to a called mobile radio terminal;

communicating said request to a SIM server including a plurality of SIM cards each selectively allocatable to any one particular radio module of a mobile radio gateway of a plurality of mobile radio gateways and each SIM card containing data specifying at least one parameter that enables the radio module to which it is allocated to carry out mobile radio communication with mobile radio terminals, wherein data of a SIM card allocated to a particular radio module of a mobile radio gateway is transmitted from said SIM server to said particular radio module via remote data transmission;

receiving routing information from said SIM server that specifies a radio module of a mobile radio gateway; and establishing a telecommunications connection with the radio module specified by said routing information from said SIM server.

* * * * *